(12) United States Patent
Gunturi et al.

(10) Patent No.: US 11,063,623 B2
(45) Date of Patent: Jul. 13, 2021

(54) BASEBAND CORRECTOR FOR RF NON-LINEARITY IN ZERO-IF RECEIVER

(71) Applicant: TEXAS INSTRUMENTS INCORPORATED, Dallas, TX (US)

(72) Inventors: Sarma Sundareswara Gunturi, Bengaluru (IN); Chandrasekhar Sriram, Chennai (IN); Jawaharlal Tangudu, Bengaluru (IN); Eeshan Miglani, Chhindwara (IN); Jagannathan Venkataraman, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/692,006

(22) Filed: Nov. 22, 2019

(65) Prior Publication Data

US 2020/0169279 A1 May 28, 2020

(30) Foreign Application Priority Data

Nov. 28, 2018 (IN) .............................. 201841044797

(51) Int. Cl.
*H04B 1/30* (2006.01)
*H04B 1/10* (2006.01)

(52) U.S. Cl.
CPC .............. *H04B 1/30* (2013.01); *H04B 1/1036* (2013.01)

(58) Field of Classification Search
CPC .... H04B 1/30; H04B 2001/0425; H04B 1/62; H04B 1/1036

USPC ..................... 455/114.3, 67.13, 324; 375/296
See application file for complete search history.

(56) References Cited

U.S. PATENT DOCUMENTS

| | | | | |
|---|---|---|---|---|
| 5,060,310 A | * | 10/1991 | Frisch | H04B 1/62 398/193 |
| 8,224,268 B2 | * | 7/2012 | Largey | H04B 17/21 455/115.2 |
| 10,111,280 B2 | * | 10/2018 | Montalvo | H04B 1/0021 |
| 2010/0310006 A1 | * | 12/2010 | Asami | G01R 31/31908 375/296 |
| 2012/0268191 A1 | * | 10/2012 | Ananthaswamy | H04L 25/03343 327/358 |
| 2013/0142284 A1 | * | 6/2013 | Asensio | H03F 1/3241 375/316 |
| 2015/0288399 A1 | * | 10/2015 | Pratt | H04L 23/00 455/296 |
| 2015/0289154 A1 | * | 10/2015 | Pratt | H04W 24/08 455/67.14 |

(Continued)

*Primary Examiner* — Nguyen T Vo
(74) *Attorney, Agent, or Firm* — John R. Pessetto; Charles A. Brill; Frank D. Cimino

(57) ABSTRACT

A non-linearity correction module, an optional droop corrector, and a zero-IF receiver with the non-linearity correction module and an optional droop corrector, wherein the non-linearity correction module is configured to generate a non-linearity term scaled to mitigate an inter-modulation component term of a RF signal received by the zero-IF receiver based on a test signal to enhance linearity in the zero-IF receiver and the optional droop corrector is configured to compensate a droop within a signal band of interest, caused by an analog low pass filter filtering a RF signal received by the zero-IF receiver, before a down-converted RF signal is fed into the non-linearity module.

23 Claims, 7 Drawing Sheets

(56) References Cited

U.S. PATENT DOCUMENTS

2017/0324421 A1* 11/2017 Tangudu ............. H03M 1/1245

* cited by examiner

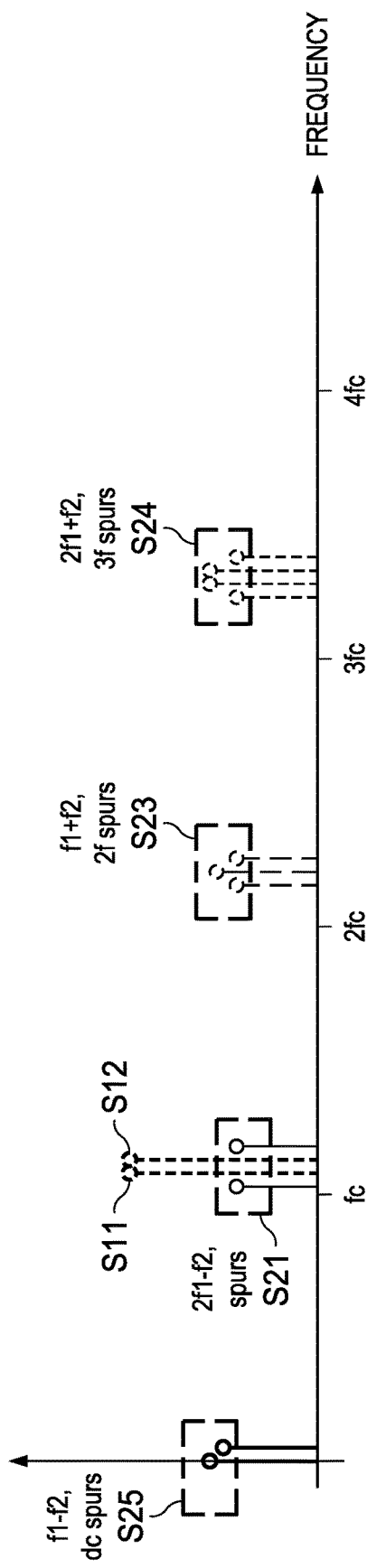
FIG. 2
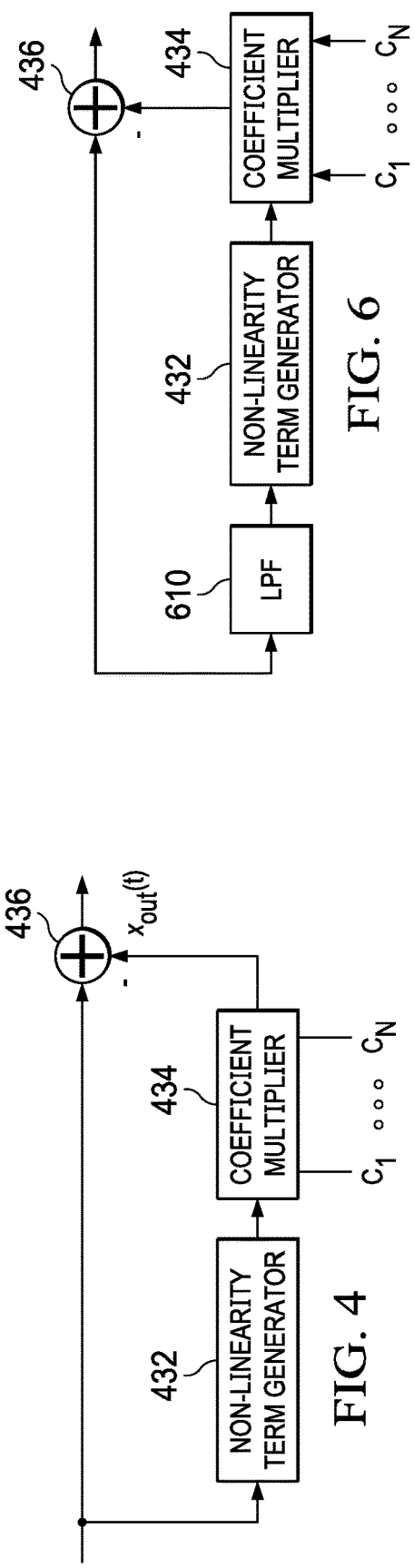
FIG. 6
FIG. 4

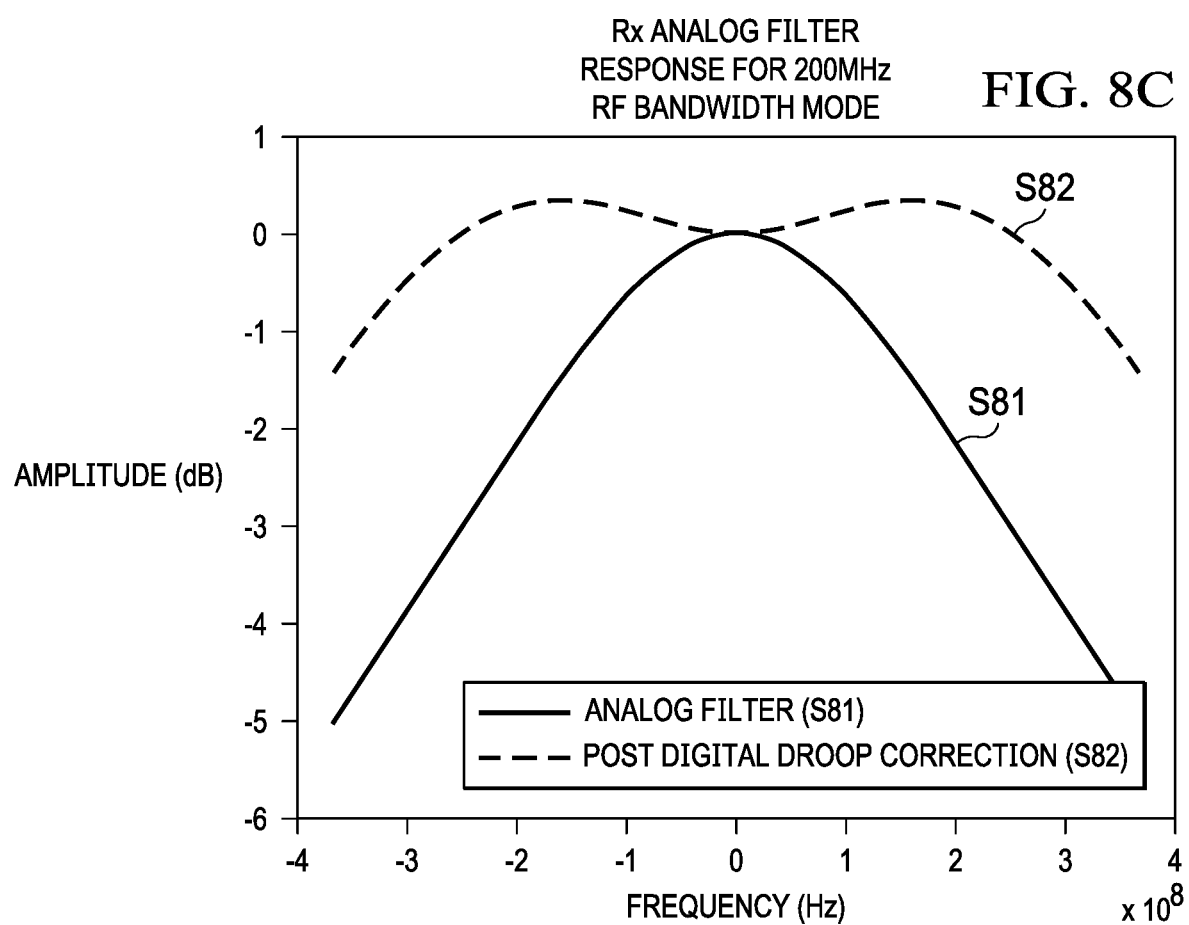

BASEBAND CORRECTOR FOR RF NON-LINEARITY IN ZERO-IF RECEIVER

RELATED APPLICATIONS

This application claims priority to India Provisional Application No. 201841044797, filed Nov. 28, 2018, which is hereby incorporated by reference.

BACKGROUND

A Zero-IF receiver directly down-converts a RF signal into a pair of quadrature signals, i.e., signal that differ in phase by 90 degrees. The reference signal of the pair of quadrature signals, which is "in-phase," is referred to as I signal. The signal that is shifted 90 degrees, in "quadrature" phase, is referred to as Q signal. In one example, a mixer of the zero-IF receiver mixes the RF signal with a local oscillator (LO) signal to generate the I and Q signals. The LO signal has two components, an in-phase (cosine) component and a quadrature (sine) component. Mixing the in-phase component and the quadrature component to the RF signal respectively generates the I signal and Q signal.

In a zero-IF receiver, the RF signal may be amplified by a gain module before down-converted into I and Q signals by the mixer. The use of such gain module can introduce non-linearity in the down-converted signals. The non-linearity components of the RF signal due to the gain module may be present at DC frequency, LO frequency, 2*LO frequency and 3*LO frequency. Typically, when a RF signal is mixed with a LO signal, only the signals around the LO frequency are designed to be down-converted. But due to duty cycle mismatch of the sine and cosine components of the LO signal, the LO signal also includes components at DC frequency, LO frequency, 2*LO frequency, 3*LO frequency, etc. Accordingly, the non-linear components of a RF signal at DC frequency, LO frequency, 2*LO frequency, 3*LO frequency, etc. are also down-converted by the DC frequency, LO frequency, 2*LO frequency, 3*LO frequency terms of the LO signal to a baseband signal level, in addition to the signal designed to be down-converted. These additional non-linear components causes interference to the desired signals.

SUMMARY

An aspect of the present invention provides a non-linearity correction module configured to generate a scaled non-linearity term to mitigate an inter-modulation component term or terms of a signal received or down-converted by a zero-IF receiver.

An aspect of the present invention provides a zero-IF receiver with an amplifier configured to amplify a signal received by the zero-IF receiver, a down-converting mixer to down-convert the received signal, an analog low pass filter configured to low pass filter the down-converted signal to reduce noise and filter undesired signal components, an analog digital converter configured to convert the down-converted signal to a digital signal, and a non-linearity correction module configured to mitigate an inter-modulation component term of the received signal by generating a scaled non-linearity term corresponding to the inter-modulation component term and adding the scaled non-linearity term to the digitized down-converted signal.

An aspect of the zero-IF receiver of the present invention may further comprise a digital low pass filter within a non-linearity correction module, which is configured to generate a scaled non-linearity term corresponding to an inter-modulation component term and adding the scaled non-linearity term to the digitized down-converted signal to mitigate the inter-modulation component term. The digital low pass filter filters out-of-band signals before the generation of the scaled non-linearity term by the non-linearity correction module.

An aspect of the zero-IF receiver of the present invention may further comprise a droop corrector configured to compensate a droop within a frequency band of interest caused by an analog low pass filter.

An aspect of a droop correction of the present invention, configured to compensate a droop caused by an analog low pass filter, may transform a filter coefficient corresponding to a first sampling frequency to a filter coefficient corresponding to a second sampling frequency, based on the sampling frequency of a non-linearity correction module or a droop corrector in the zero-IF receiver.

BRIEF DESCRIPTION OF THE DRAWINGS

For a detailed description of various examples, reference will now be made to the accompanying drawings in which:

FIG. 2 illustrates a frequency spectrum with inter-modulation component terms, FIG. 4 illustrates a block diagram of a non-linearity correction module according to an aspect of the present invention, FIG. 6 illustrates a block diagram of a non-linearity correction module according to an aspect of the present invention, FIGS. 8A, 8B, and 8C illustrate graphs with responses of a low pass filter and a droop corrector according to an aspect of the present invention.

DETAILED DESCRIPTION

In the following detailed description, reference is made to certain examples of the present invention. These examples are described with sufficient detail to enable those skilled in the art to practice them. It is to be understood that other examples may be employed and that various structural, logical, and electrical changes may be made. Moreover, while specific examples are described in connection with a zero-IF receiver, it should be understood that features described herein are generally applicable to other types of electronic parts, circuits, or transmitters.

In this description, the term "couple" or "couples" means either an indirect or direct wired or wireless connection. Thus, if a first device couples to a second device, that connection may be through a direct connection or through an indirect connection via other devices and connections. For another instance, when a first device is coupled to a second device, the first and second device may be coupled through a capacitor. The recitation "based on" means "based at least in part on." Therefore, if X is based on Y, X may be a function of Y and any number of other factors.

Figure 1:
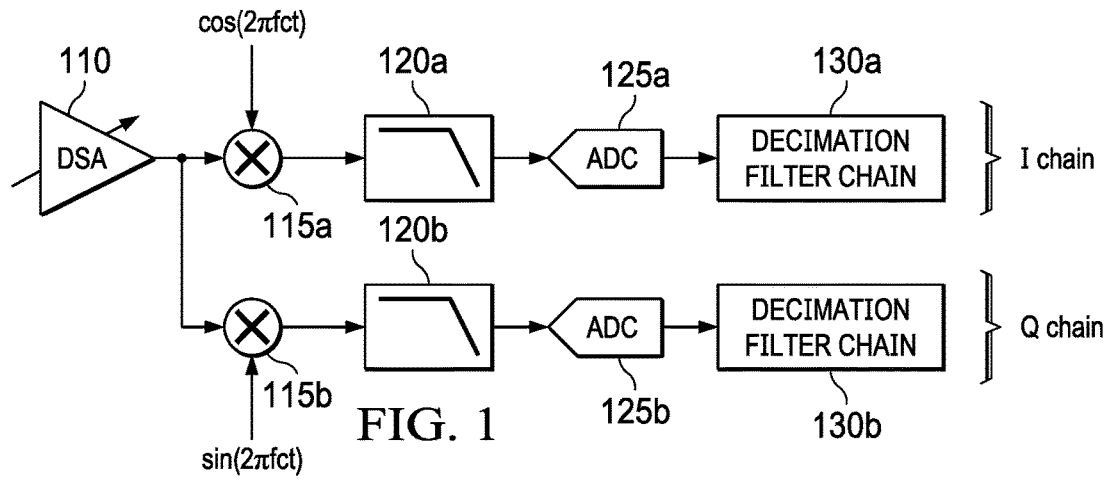
FIG. 1 illustrates a block diagram of a zero-IF receiver.

FIG. 1 illustrates a block diagram of a zero-IF receiver. In the example of FIG. 1, a zero-IF receiver comprises digital step attenuator (DSA) 110 configured to amplify or attenuate a signal received by the zero-IF receiver, mixer 115a and mixer 115b configured to down-convert the received signal into IQ baseband signals by mixing the received signal with in-phase and quadrature phase components of a local oscillator (LO), low pass filter 120a and low pass filter 120b configured to low pass filter the down-converted IQ signal to filter noise and undesired signal components such as image component(s), analog digital converter 125a and analog digital converter 125b configured to convert the down-converted IQ signal into digital signals, and decimation filter chain 130a and decimation filter chain 130b, both optional, configured to down-sample the digitized down-converted IQ signal depending on the required sampling rate.

Zero-IF receivers, as well as transmitters, have high performance requirements, which requires suppression of inter-modulation components to minimize their impact on receiver thermal noise floor. Non-linearity of zero-IF receivers, however, creates inter-modulation components of IQ RF signals. These inter-modulation components fall in the signal band of interest and reduce the signal to noise distortion ratio. Non-linearity also creates distortion components in the presence of high power blockers and reduces the zero-IF receiver's sensitivity performance.

FIG. 2 illustrates a frequency spectrum with inter-modulation components. In particular, the frequency spectrum of FIG. 2 illustrates spurs of $2^{nd}$ and $3^{rd}$ order inter-modulation components, which are non-linear components, where baseband input signal comprises a signal of frequency f1 (S11) and a signal of frequency f2 (S12). As illustrated, the non-linearity of a zero-IF receiver, for instance a non-linearity of digital step attenuator 110, generates inter-modulation and harmonic components around DC, fc, 2fc, and 3fc frequencies, where fc is the center frequency of the input RF signal.

The $3^{rd}$ order inter-modulation distortion components (2f1-f2 spurs, S21) fall near the desired baseband input signal S11 and S12, within the band of interest. The $3^{rd}$ order harmonic distortion components (3f spurs, S24) and $3^{rd}$ order inter-modulation distortion components (2f1+f2 spurs, S24) do not fall in the band of interest, as they are far off from input signals S11 and S12. The $3^{rd}$ order harmonic distortion components, as well as $3^{rd}$ order inter-modulation distortion components, however, are down-converted by mixers 115a, 115b to a baseband level, with the desired baseband signal, due to a third harmonic spur of a local oscillator. $2^{rd}$ order harmonic distortion components (2f spurs, S23) and inter-modulation distortion components (f1+f2 spurs, S23) are also down-converted with the desired baseband signal due to a second harmonic spur of a local oscillator. Similarly, near DC frequency, $2^{nd}$ order inter-modulation distortion components (f1-f2 spurs, S25) are down-converted with the desired baseband signal due to a DC spur of a local oscillator.

Because the non-linearity spurs, such as inter-modulation components and harmonic distortion components, are down-converted to baseband level signals based on the spurs of the local oscillator, the levels of these spurs are different from one another. When these spurs exist within the baseband, it negatively impacts the spur specification of a zero-IF receiver.

An aspect of the present invention generates a non-linearity term corresponding to the down-converted harmonic or inter-modulation distortion component terms. The non-linearity term generated according to the aspect of the present invention is scaled to negate the corresponding down-converted harmonic or inter-modulation distortion component terms. Accordingly, signal aliasing or interference caused by the harmonic or inter-modulation distortion component terms is mitigated.

Yet according to another aspect of the present invention, various filters may be employed, before or after the generation of the scaled non-linearity terms, to further prevent aliasing or interference caused by the harmonic or inter-modulation distortion components terms. For example, a digital low pass filter may be employed to filter out-of-band signals at a digital level, after a RF passband signal received by a zero-IF receiver is digitized but before the scaled non-linearity terms are generated. In another example, a droop correction may be employed to correct a droop within a signal of interest, caused by an analog low pass filter, before the scaled non-linearity terms are generated. In another example, a chain of decimation filters may be employed to filter out-of-band signals, before or after the generation of the scaled non-linearity terms.

FIGS. 3-10 below illustrate various example according an aspect of the present invention, in further detail.

Figure 3:
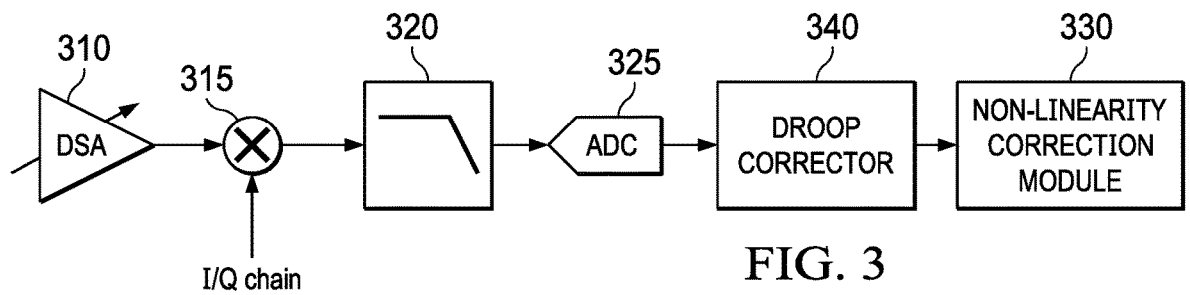
FIG. 3 illustrates a block diagram of a zero-IF receiver according to an aspect of the present invention.

FIG. 3 illustrates a block diagram of a zero-IF receiver according to an aspect of the present invention. The zero-IF receiver of FIG. 3 comprises digital step attenuator 310 configured to amplify or attenuate a RF signal received by the zero-IF receiver, mixer 315 configured to mix the received RF signal with in-phase and quadrature phase components of a local oscillator and down-convert the received RF signal, analog low pass filter 320 configured to low pass filter the down-converted signal to reduce noise and undesired signal components like image component(s), analog digital converter 325 configured to convert the down-converted signal into digital signals, and non-linearity correction module 330 configured to generate a non-linearity component term scaled to mitigate inter-modulation or harmonic components caused by non-linearity in the digitized, down-converted signal.

In one example, non-linearity correction module 330 operates at a frequency that is at least two times higher than the Nyquist frequency of the baseband signal of the zero-IF receiver. The high operating frequency of non-linearity correction module 330 further prevents signal aliasing.

The zero-IF receiver of FIG. 3 may further comprise droop corrector 340, optionally, which is configured to compensate the digitized, down-converted signal, at least a portion of which is suppressed due to analog low pass filter 320. Analog low pass filter 320, while suppressing signals outside the band of interest, may cause a droop within the band of interest. This does not affect the reception algorithm because the droop has been factored in as part of a channel estimate. The droop, however, may impact the non-linearity compensation because non-linear spurs are generated by digital step attenuator 310. The non-linearity correction performed by non-linearity correction module 330 at a digital signal level generates the non-linearity terms based on a signal already filtered by analog low pass filter 320. Droop corrector 340 compensates the discrepancy in non-linearity compensation due to a droop caused by analog low lass filter 320.

For example, droop corrector 340 may be a filter with a response inverse to analog low pass filter 320, as described below in relation to FIGS. 8A, 8B, and 8C. Additional aspects of a droop corrector configured to compensate a droop caused by an analog low lass filter, according to various aspect of the present invention, are further described in relation to FIGS. 9 and 10.

FIG. 4 illustrates a block diagram of a non-linearity correction module, e.g., non-linearity correction module 330 of FIG. 3, according to an aspect of the present invention. In the example of FIG. 4, non-linearity correction module comprises non-linearity term generator 432 configured to generate at least one non-linearity term corresponding to at least one of inter-modulation or harmonic component of a received signal. Non-linearity correction module further comprises coefficient multiplier 434 configured to multiply the non-linearity term generated by non-linearity term generator 432 with a corresponding non-linearity term coefficient, and sum logic 436 configured to add the non-linearity term multiplied by the corresponding non-linearity term coefficient to a baseband signal of a zero-IF receiver to mitigate the at least one of inter-modulation or harmonic component.

In one example, non-linearity term generator 432 generates terms corresponding to 2f1+f2, 3f, and 2f1−f2 components. Where $x_{RF}(t)$ is the RF signal (e.g., signal input to zero-IF receiver of FIG. 3) and $x_{bb}(t)$ is the complex baseband signal (e.g., output of analog digital converter 325 or droop corrector 340 of FIG. 3), the RF signal can be expressed according to equation 1 below.

$$x_{RF}(t) = x_{bb}(t)e^{jw_c t} + x_{bb}^*(t)e^{-jw_c t}$$

$$x_{RF}(t) = (x_{bb}(t)e^{jw_c t} + x_{bb}^*(t)e^{-jw_c t}),\quad \text{Eq. 1})$$

where $x_{bb}^*(t)$ is the complex conjugate of $x_{bb}(t)$.

If we assume that the RF third order non-linearity is of the form $x_{RF}^3(t)$, then $x_{RF}^3(t)$ is expressed according to equation 2 below.

$$\begin{aligned}x_{RF}^3(t) &= (x_{bb}(t)e^{jw_c t} + x_{bb}^*(t)e^{-jw_c t})^3 \\ &= x_{bb}^3(t)(t)e^{3jw_c t} + (x_{bb}^*(t))^3 e^{-3jw_c t} + \\ &\quad 3|x_{bb}(t)|^2 x_{bb}(t)e^{jw_c t} + \\ &\quad 3|x_{bb}(t)|^2 x_{bb}^*(t)e^{jw_c t}\end{aligned} \quad \text{Eq. 2}$$

Terms $|x_{bb}(t)|^2 x_{bb}(t)$, and $(x^*_{bb}(t))^3$ are down-converted by mixer 315 due to a third harmonic spur of a local oscillator. Non-linearity term generator 432 generates non-linearity terms $x^2_{bb}(t)$, $|x_{bb}(t)|^2$, $|x_{bb}(t)|^2 x_{bb}(t)$, and $(x_{bb}^*(t))^3$, which respectively corresponds to different types of second order and third order non-linearity spurs (e.g., inter-modulation component, harmonic component).

The non-linearity terms $x^2_{bb}(t)$, $|x_{bb}(t)|^2$, $|x_{bb}(t)|^2 x_{bb}(t)$, and $(x_{bb}^*(t))^3$ are scaled by independent coefficients before added to the original complex baseband signal by sum logic 436. Coefficient multiplier 434 generates complex coefficients $c_1, c_2, \ldots c_N$ that are respectively multiplied to the corresponding non-linearity terms generated by non-linearity term generator 432. In FIG. 4, $x_{out}(t)$ is the output of sum logic 436, and mathematically expressed according to equation 3 below.

$$x_{out} = x + c_1 * x^2 + c_2 * xx^* + c_3 * x^2 x^* + c_4 * x^{*3} \quad \text{Eq. 3}$$

In the above equation 3, $x_{out}$ is a simplified form of $x_{out}(t)$ and x is a simplified form of $x_{bb}(t)$. The coefficients $c_1, c_2, \ldots c_N$ can be determined by injecting test signals as analog RF input to the zero-IF receiver. For example, to determine the coefficient for term $x^2$, a RF signal based on a complex baseband test signal with two complex exponentials at frequencies $f_1$ and $f_2$ is injected. When $x_{bb}(t)$ is based on the sum of the two complex exponentials at frequencies $f_1$ and $f_2$, $x_{bb}(t)$ can be expressed as equation 4 below.

$$x_{bb}(t) = e^{j2\pi f_1 t} + e^{j2\pi f_2 t} \quad \text{Eq. 4})$$

A RF signal based on $x_{bb}(t)$ of equation 4 is derived according to equation 1 above.

After the input of the test RF signal, the amplitude and phase of signal at frequency $f_1+f2$ are observed at the output of analog digital converter 325 or at the droop corrector output 340. A complex coefficient for a non-linearity term of $x^2$ will be the negative of the amplitude, and phase, of signal at frequency $f_1+f2$ so that the non-linearity term $x^2$ is mitigated. Similarly, to determine non-linearity coefficients for other non-linearity terms, additional RF test signal of two complex exponentials are injected, and amplitude and phase of signals at different frequencies are observed. For a coefficient for a non-linearity term $xx^*$, the amplitude and phase of the signal at $f_1-f2$ frequency may be observed. For a coefficient for a non-linearity term $x^2x^*$, amplitude and phase of a signal at $2f_1-f_2$ may be observed, and for a non-linearity term $x^{*3}$, amplitude and phase of a signal at $-3f_1$ and $-3f_2$ may be observed.

Figure 5:
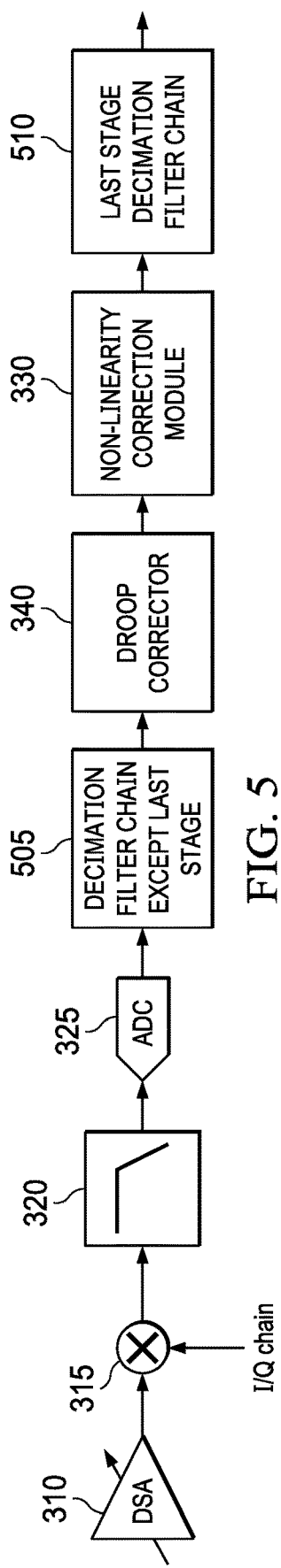
FIG. 5 illustrates a block diagram of a zero-IF receiver according to an aspect of the present invention.

FIG. 5 illustrates a block diagram of a zero-IF receiver according to an aspect of the present invention. When there are non-linearity spurs outside the band of interest, generating a non-linearity term corresponding to $2^{nd}$ or $3^{rd}$ order inter-modulation or harmonic terms creates spurs at twice or thrice the spur frequency, respectively. Depending on a sampling frequency, the non-linearity terms corresponding to the $2^{nd}$ and $3^{rd}$ order terms, as well as the spurs at twice or thrice the spur frequency, may alias into the signal band.

A zero-IF receiver of FIG. 5 comprises decimation filter chains 505 and 510 to filter out spurs or interferers before and after the generation of scaled non-linearity terms by non-linearity correction module 330. In the example of FIG. 5, droop corrector 340 and non-linearity correction module 330 is placed between decimation filter chains 505 and 510. First part of decimation filter chain, i.e., decimation filter chain except last stage 505, reduces spurs or interferers before a signal is fed into droop corrector 340 or non-linearity correction module 330. Second part of decimation filter chain, i.e., last stage decimation filter chain 510, further eliminates out-of-band non-linearity spurs generated by non-linearity correction module 330. Decimation filter chains 505 and 510 may further be configured to decimate outputs of analog digital converter 325 to a required sample rate before the outputs are fed into droop corrector 340 or non-linearity correction module 330.

FIG. 6 illustrates a block diagram of a non-linearity correction module according to an aspect of the present invention. In the example of FIG. 6, non-linearity correction module (e.g., non-linearity correction module 330 of FIG. 3) further comprises digital low pass filter 610. Digital low pass filter 610 is configured to attenuate out-of-band blockers that may alias with the generation of non-linearity terms. The placement of low pass filter 610 is optimal in terms of power because digital low pass filter 610 can be realized with low power specification as the non-linearity terms multiplied by their corresponding coefficients are low.

In one example, non-linearity terms generated by non-linearity term generator 432 are $x^2$, $xx^*$, $x^2x^*$ and $(x^{*3})$, and the complex baseband signal x (e.g., output of analog digital converter 325 or droop corrector 340 of FIG. 3) has a bandwidth of BW. Assuming in this example that the band of interest is between −100 and 100 MHz and non-linearity term generator is operating at 500 MHz sampling frequency, signal x can have interfering signals outside the bandwidth of interest. For example, consider that the signal has interferers at 140 MHz and 220 MHz.

Mathematically, the signal x can be expressed as the sum of desired signal and the interferers, according to below equation 5.

$$x = x_{sig} + x_{int} \quad \text{Eq. 5)}$$

In the above equation 5, where $x_{sig}$ is the desired signal and $x_{int}$ is the interference signal. Also, a non-linearity term $x^2$ can be expressed according to below equation 6.

$$x^2 = (x_{sig} + x_{int})^2 = x_{sig}^2 + x_{int}^2 + 2x_{sig}x_{int} \quad \text{Eq. 6)}$$

In this example, if the $x_{int}$ has components at 140 MHz and 220 MHz, then the signal $x_{int}^2$ has frequency components at 2*140=280 MHz and 2*220=440 MHz. However, since the sampling frequency of non-linearity correction module 330 is 500 MHz, the frequency components of 280 and 440 MHz will alias to 280−500=−220 MHz and 440−500=−60 MHz. The component at −60 MHz falls in the band of interest of −100 to 100 MHz and interferes with the signal. This is not desirable, especially, as the interferer power could be much higher than the signal and interferer aliasing to in-band can significantly degrade the performance.

Further, when the 3$^{rd}$ order term is expressed as according to equation 7 below, $$x^{*3} = (x_{sig} + x_{int})^{*3} = x_{sig}^{*3} + x_{int}^{*3} + 3x_{sig}^{*2}x_{int}^{*} + 3x_{int}^{*2}x_{sig}^{*}, \quad \text{Eq. 7)}$$

consider the term, $x_{int}^{*3}$. If the interferer signal has frequency components at 140 and 220 MHz, then $x_{int}^{*}$ has frequency components at −140 and −220 MHz. Hence, $x_{int}^{*3}$, will have frequency components at 3*−140=−420 MHz and 3*−220=−660 MHz. Due to the sampling frequency of 500 MHz, the components will alias to −420+500=80 MHz and −660+500=−160 MHz. Thus the component at 140 MHz will alias to in-band 80 MHz due to the generated non-linearity components. This can degrade the system performance. In other words, if the bandwidth of the complex baseband signal x is BW, then the bandwidth for the 2$^{nd}$ and 3$^{rd}$ order non-linearity terms is 2*BW and 3*BW respectively, which may alias to in-band based on the sampling frequency of non-linearity correction module 330.

Even after the received signal passes through analog low pass filter 320, the remaining spurs may be high. Digital low pass filter 610 significantly suppress these spurs before the generation of non-linear terms by the non-linearity correction module 330. In other words, digital low pass filter 610 further attenuates the spurs in the frequency range outside the signal bandwidth so that interference caused by non-linearity terms generated by non-linearity correction module 330 is negligible.

Figure 7:
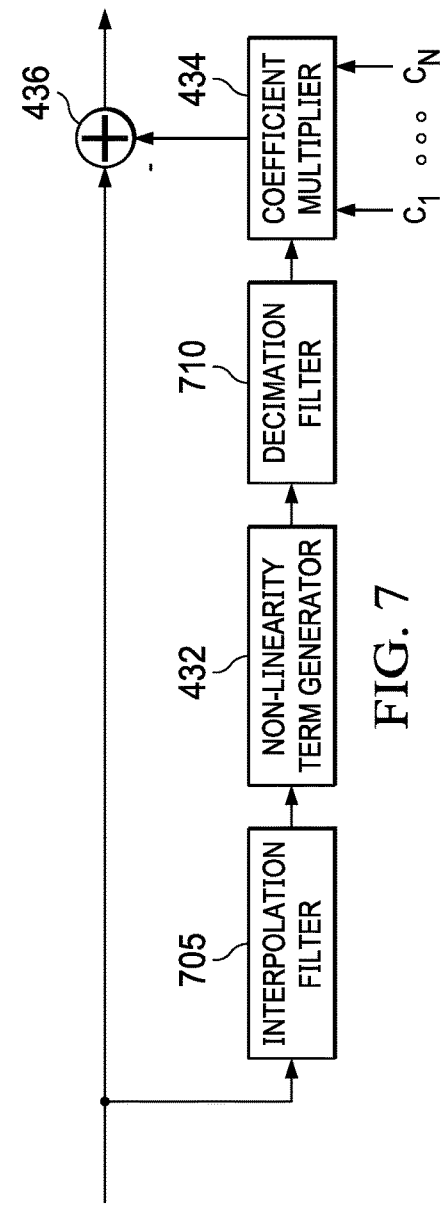
FIG. 7 illustrates a block diagram of a non-linearity correction module according to an aspect of the present invention.

FIG. 7 illustrates a block diagram of a non-linearity correction module according to an aspect of the present invention. In the example of FIG. 7, non-linearity correction module (e.g., non-linearity correction module 330 of FIG. 3) comprises interpolation filter 705 and decimation filter 710. Interpolation filter 705 and decimation filter 710 may be employed in lieu of, or in conjunction with, decimation filter chains 505, 510 of FIG. 5 and digital low pass filter 610 of FIG. 6.

In FIG. 7, interpolation filter 705 is placed before non-linearity term generator 432 and decimation filter 710 is placed after non-linearity term generator 432. In the structure of FIG. 7, non-linearity term generator 432 generates non-linearity terms at a higher rate, which are subsequently decimated to an original rate, and spurs created outside the original rate is filtered by decimation filter 710. Interpolation filter 705, interpolates by a factor of D before a signal is fed to non-linearity term generator 432. Decimation filter 710 decimates the output of non-linearity term generator 432 by a factor of D.

Where low pass filter 610 is part of a non-linearity correction module (as in FIG. 6), the non-linearity correction module may be placed between decimation filters 505 and 510 of FIG. 5. Where interpolation filter 705 and decimation filter 710 are part of a non-linearity correction module (as in FIG. 7), the non-linearity correction module may be placed after both decimation filter chains 505 and 510 of FIG. 5.

Figure 8A:
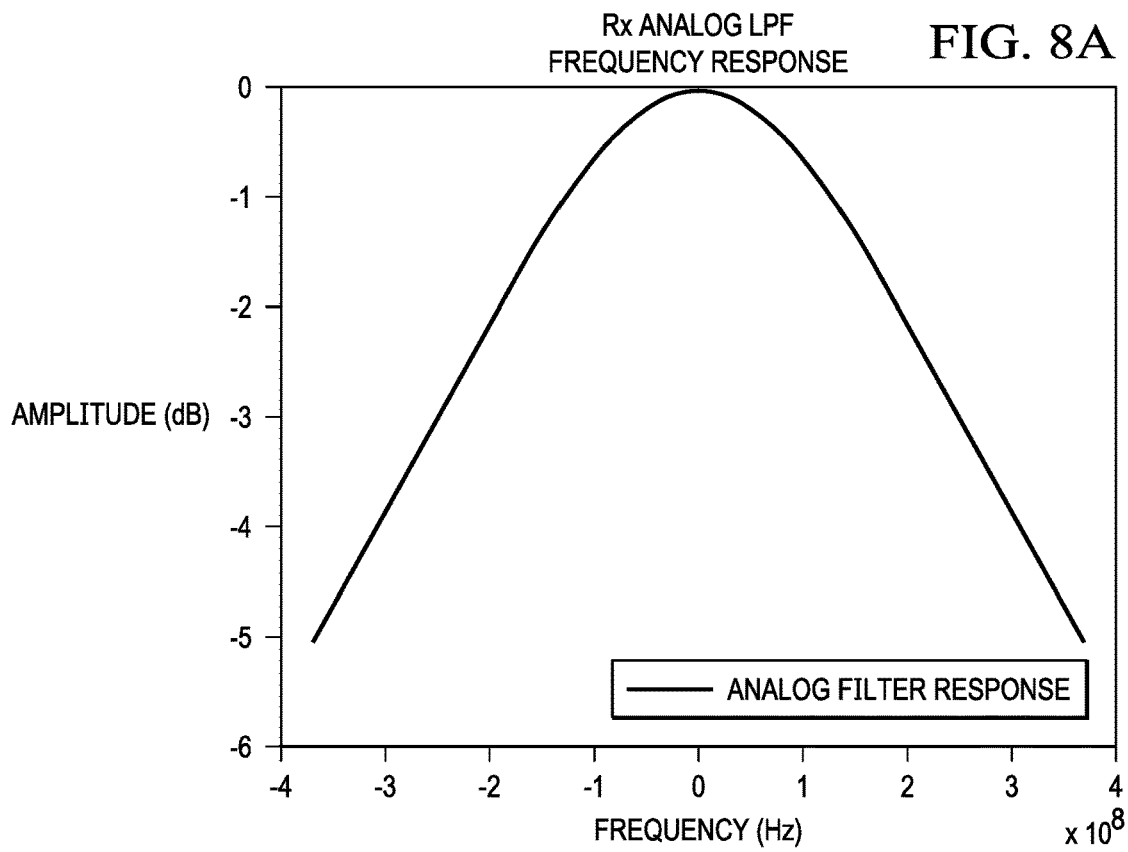
Figure 8B:
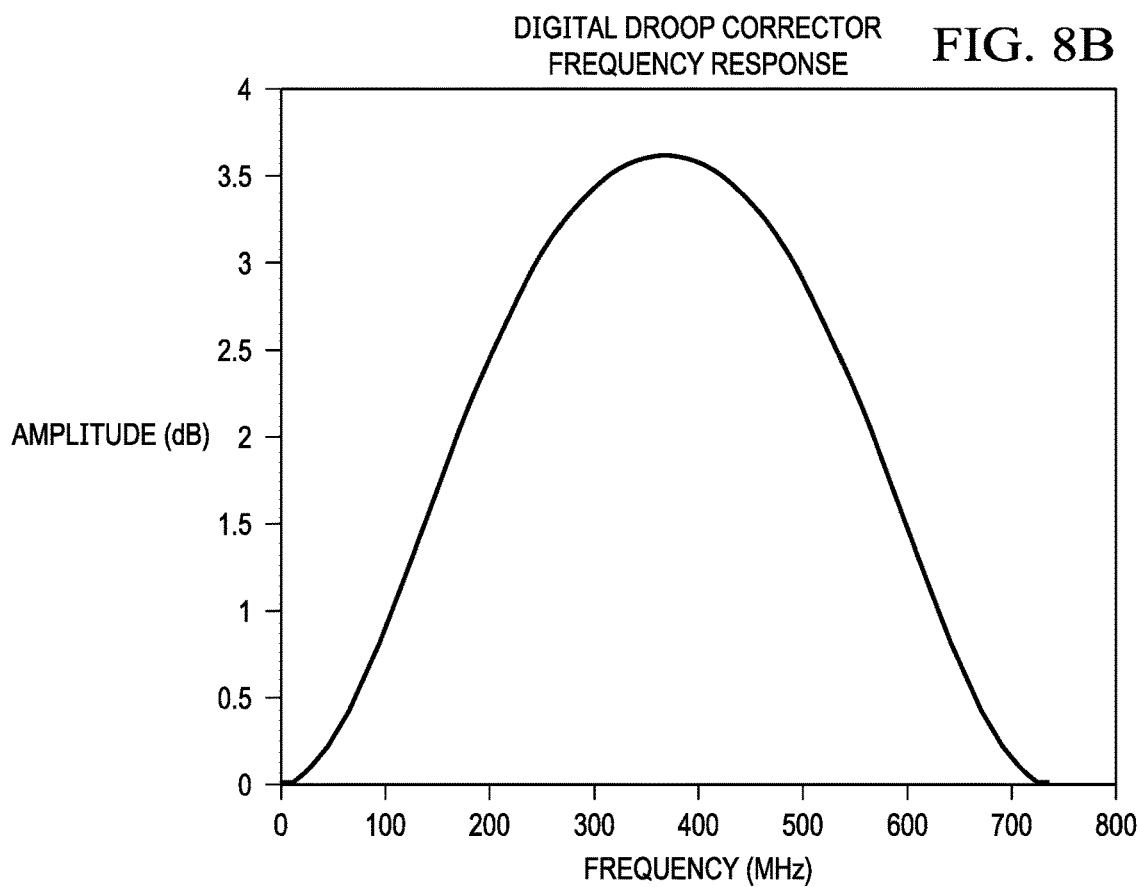

FIGS. 8A, 8B, and 8C illustrate graphs with responses of an analog low pass filter and a droop corrector according to an aspect of the present invention. In particular, graph of FIG. 8A illustrates a response of analog low pass filter 320, graph 8B a response of droop corrector 340, and graph 8C a response of both. Droop corrector 340 may be optionally employed by a zero-IF receiver according to an aspect of the present invention to compensate the droop introduced by analog low pass filter 320. In the example of graph of FIG. 8A, analog low pass filter 320 is a single pole filter with a pole at 250 MHz with a signal bandwidth of 100 MHz. Because of analog low pass filter 320, a signal received by the zero-IF receiver observes a droop of about 0.65 dB at 100 MHz, compared to the response at D.C. See FIG. 8A.

Droop corrector 340 has a response inverse to the response of analog low pass filter 320. For instance, if the magnitude of analog low pass filter 320 response in the signal band of interest is denoted $|H_{LF}(f)|$, the desired response of droop corrector 430 in the band of interest is $1/|H_{LPF}(f)|$. Droop corrector 340 response is shown in graph of FIG. 8B. As illustrated, droop corrector 340 operates at 750 MHz and the response in the frequency range 1 to 100 Mz is close to the inverse of the response of analog low pass filter 320. Graph of FIG. 8C illustrates the combined responses of low pass filter 320 (S81) and droop corrector 340 (S82).

Figure 9:
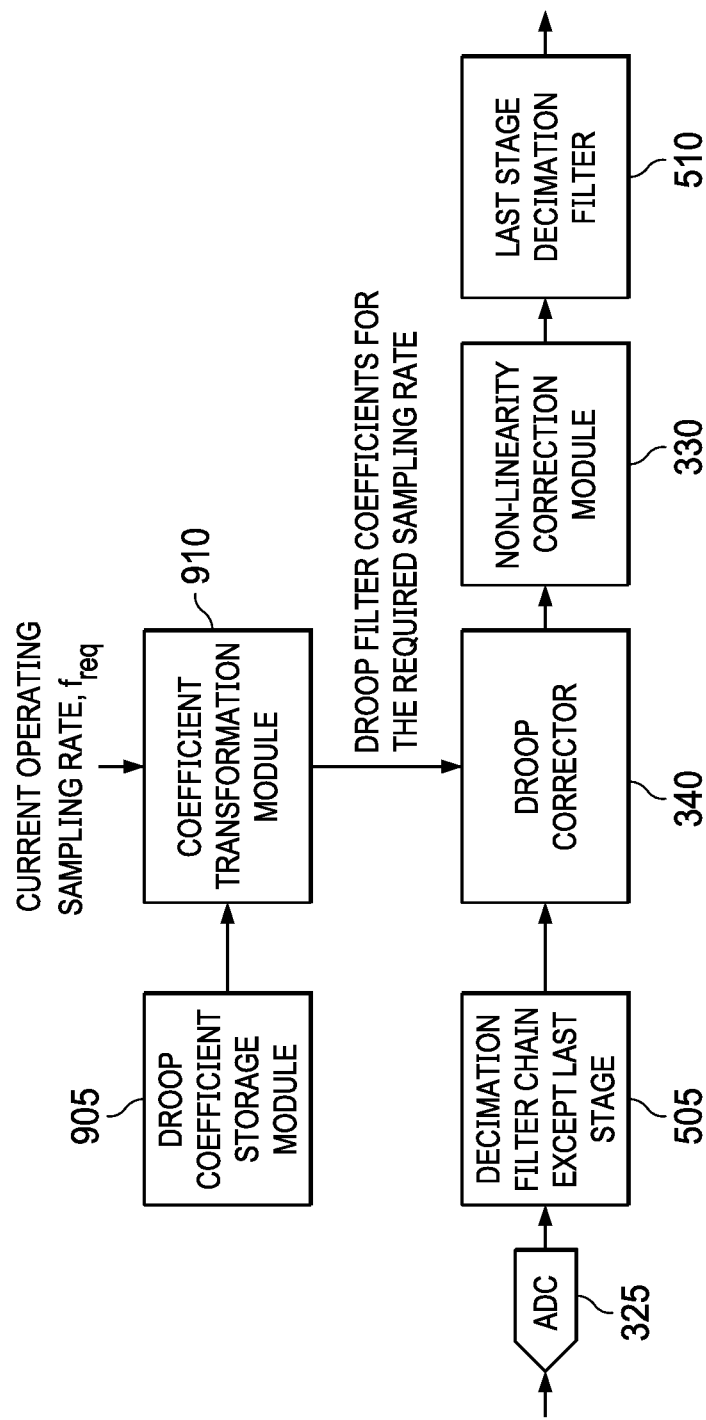
FIG. 9 illustrates a block diagram of a zero-IF receiver, including a droop corrector, according to an aspect of the present invention.

FIG. 9 illustrates a block diagram of a zero-IF receiver, including a droop corrector, according to an aspect of the present invention. In the example of FIG. 9, the zero-IF receiver according to an aspect of the zero-IF receiver comprises analog digital convertor 325, droop corrector 340, non-linearity correction module 330, and decimation filter chains 505, 510. The zero-IF receiver of FIG. 9 further comprises droop coefficient storage module 905 configured to store coefficient(s) of droop corrector 340, and coefficient transformation module 910 configured to transform the stored coefficient to correspond to another sampling rate according to the sampling rate of the droop corrector 340 in the zero-IF receiver.

Figure 10:
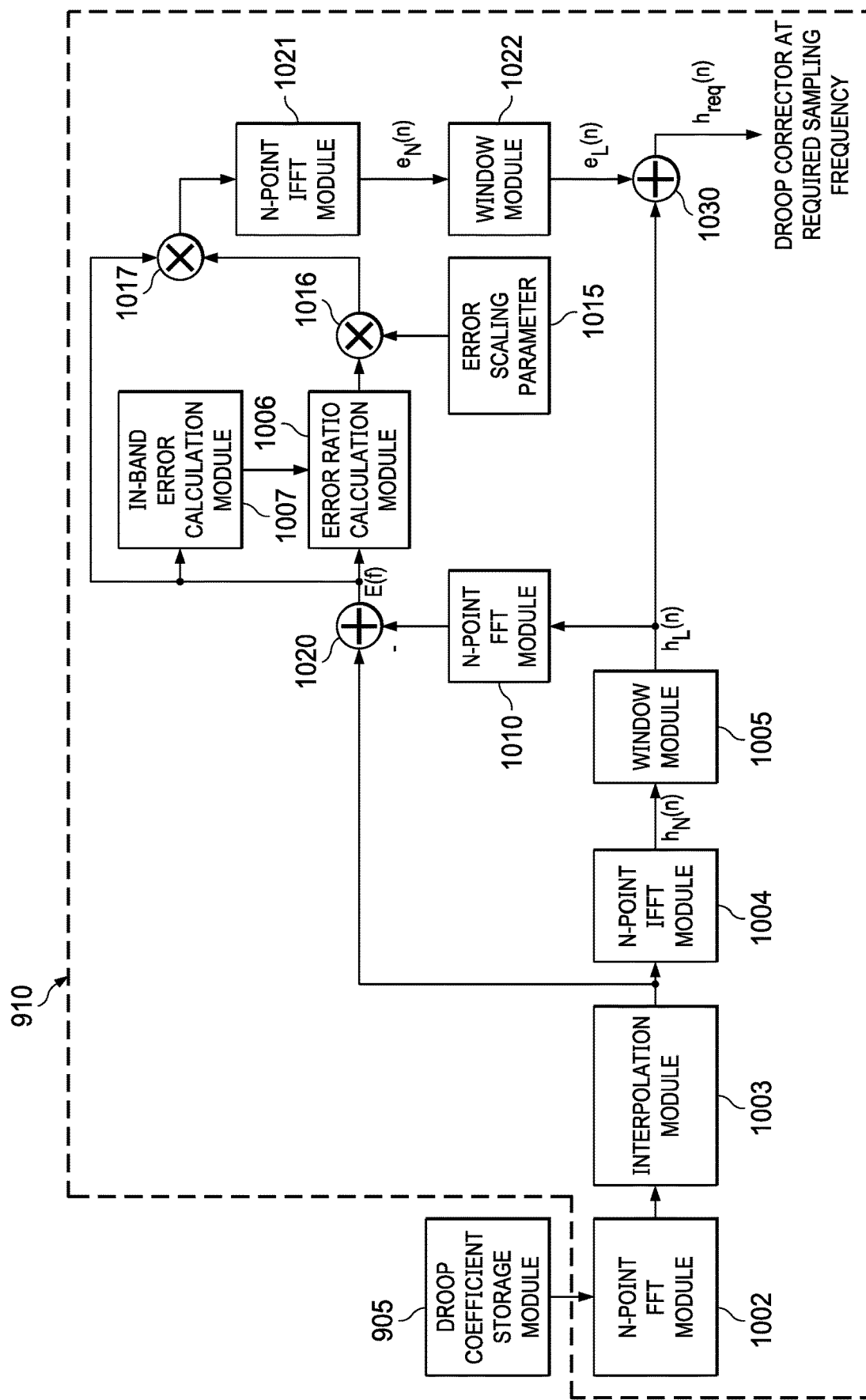
FIG. 10 illustrates a block diagram of a coefficient transformation module according to an aspect of the present invention.

FIG. 10 further illustrates the transformation of coefficient of droop corrector 340 corresponding to one sampling frequency to another sampling frequency according to an aspect of the present invention. In FIG. 10, time domain droop corrector response, including its filter coefficient, is stored in droop coefficient storage module 905 for one sampling frequency, $f_{max}$. Coefficient transform module 910 computes the time domain droop corrector filter coefficients at the required sampling frequency $f_{req}$, based on the values stored in droop coefficient storage module 905 and the required sampling rate, $f_{req}$.

In one example, the required sampling frequency $f_{req}$ is smaller than stored sampling frequency $f_{max}$. In this example, N-point fast fourier transform (FFT) module 1002 fast fourier transforms the stored droop corrector filter coefficients stored in droop coefficient storage module 905. The fast fourier transform by N-point FFT module 1002 provides a frequency response within the frequency range $[-f_{max}/2 \ f_{max}/2]$ with frequency resolution of $f_{max}/N$.

Frequency response at stored sampling frequency, $f_{max}$, is denoted as $H_{max}(f)$. Frequency response at required sampling frequency, $f_{req}$, is denoted as $H_{req}(f)$. The magnitude of the required sampling frequency response, $H_{req,mag}(f)$, within the frequency range $[-f_{req}/2 \ f_{req}/2]$ with the frequency resolution $f_{req}/N$ is determined by using the magnitude of the stored sampling frequency response $H_{max}(f)$, i.e., $H_{max,mag}(f)$. At any frequency location $k*f_{req}/N$ (k=0, 1, ... N−1), the magnitude is of a required sampling frequency response based on the interpolation of the values of $H_{max,mag}(f)$. Interpolation is performed by interpolation module 1003. In interpolation module 1003, a complex conjugate phase $e^{-j2\pi l/N}$ for l=0 to N−1 is multiplied to the magnitude $H_{req,mag}(f)$ to determine the frequency response $H_{req}(f)$. N-point inverse fast fourier transform (IFFT) module 1004 provides the time domain filter response of N length $h_N(n)$. To determine the coefficients of a L-tap length droop corrector filter, window module 1005 performs a rectangular window on the time domain filter response $h_N(n)$. The rectangular window of length L to generate the filter coefficients may be expressed as below equation 8.

$$h_L(n)=h_N(n), n=0,1, \ldots (L-1)/2 \text{ and } (L-1)/2, \ldots N-1$$

$$h_L(n)=0, \text{otherwise}. \quad \text{Eq. 8)}$$

N-point FFT module 1010 performs fast fourier transform of $h_L(n)$, which is denoted as $H_L(f)$ in the frequency range $[-f_{req}/2 \ f_{req}/2]$. The difference between $H_L(f)$ and $H_{req}(f)$ is computed by adder 1020 according to the below equation 9.

$$E(f)=H_{req}(f)-H_L(f) \quad \text{Eq. 9)}$$

The error power in the entire band is computed based on the below equation 10.

$$\Sigma_{-f_{req}/2}^{f_{req}/2} |E(f)|^2 \quad \text{Eq. 10)}$$

The error power in the in-band signal bandwidth is computed based on the below equation 11 by in-band error calculation module 1007.

$$\Sigma_{-BW/2}^{BW/2} |E(f)|^2 \quad \text{Eq. 11)}$$

Error ratio calculation module 1006 computes the ratio of total error power of entire band to the error power of in-band based on below equation 12.

$$ErrRatio = \frac{\sum_{-f_{req}/2}^{f_{req}/2} |E(f)|^2}{\sum_{-BW/2}^{BW/2} |E(f)|^2} \quad \text{Eq. 12)}$$

The error ratio calculated by error ratio calculation module 1006 is multiplied with an error scaling parameter 1015 by multiplier 1016. The scaled version of ErrRatio, which is output of multiplier 1016 is further is multiplied to E(f) by multiplier 1017. N-point IFFT module 1021 performs inverse fast fourier transform of the output of multiplier 1017. The output of N-point IFFT module 1021, which are time domain error filter coefficients, is denoted as $e_N(n)$.

The L-tap error filter coefficients, $e_L(n)$, are determined by the rectangular windowing of $e_N(n)$ by window module 1022. Adder 1030 adds the L-tap error filter coefficients $e_L(n)$ to L-tap filter coefficients $h_L(n)$ to provide the filter coefficients of droop corrector 340, $h_{req}(n)$, at the required sampling frequency, according to the equation 13 below.

$$h_{req}(n)=h_L(n)+e_L(n) \quad \text{Eq. 13)}$$

In the above example, $f_{max}$ is larger than $f_{req}$. An aspect of the present invention also applies to when $f_{max}$ is smaller than $f_{req}$. In this case, to determine the frequency response at required sampling frequency $f_{req}$ from frequency response corresponding to stored sampling frequency $f_{max}$, an extrapolation module, in lieu of interpolation module 1003 may be employed.

Modifications are possible in the described embodiments, and other embodiments are possible, within the scope of the claims.

What is claimed is:

1. A non-linearity correction module comprising;
    a non-linearity term generator configured to generate a non-linearity term corresponding to an inter-modulation or harmonic component caused by a non-linearity of a zero-IF receiver;
    a coefficient multiplier coupled to the non-linearity term generator and configured to multiply the non-linearity term with a corresponding non-linearity term coefficient; and
    a sum logic coupled to the coefficient multiplier and configured to add the non-linearity term multiplied by the corresponding non-linearity term coefficient to a baseband signal of the zero-IF receiver;
    wherein the non-linearity term multiplied by the corresponding non-linearity term coefficient mitigates the corresponding inter-modulation or harmonic component of the baseband signal;
    wherein the non-linearity term coefficient is determined by injecting a RF test signal with frequencies based on the non-linearity term, and determining amplitude and phase of the RF test signal down-converted by the zero-IF receiver at the non-linearity term frequency.

2. The non-linearity correction module of claim 1,
    wherein the non-linearity term coefficient is negative of the amplitude, and the phase, of the down-converted RF test signal.

3. The non-linearity correction module of claim 1,
    wherein the non-linearity term comprises at least one of the following signals, $$X^2_{bb}(t), |X_{bb}(t)|^2, |X_{bb}(t)|^2 X_{bb}(t), \text{ and } (X^*_{bb}(t))^3,$$

wherein $x_{bb}(t)$ is a complex baseband signal received by the zero-IF receiver;
    where in $x^*_{bb}(t)$ is the complex conjugate of $x_{bb}(t)$;
    wherein the coefficient multiplier is configured to determine a coefficient corresponding to one of the non-linearity terms by injecting a RF test signal based on a complex baseband signal with two complex exponentials at frequency f1 and frequency f2 to a zero-IF receiver comprising the non-linearity correction module, and observing an amplitude and phase of the RF test signal down-converted at a frequency corresponding to the one of the non-linearity terms,
    wherein the frequency corresponding to the one of the non-linearity terms is based on frequency f1 and frequency f2.

4. The non-linearity correction module of claim 1 further comprising,
an interpolator coupled to the non-linearity term generator and configured to up-sample the baseband signal before the baseband signal is fed into the non-linearity term generator; and
a decimator coupled to the non-linearity term generator and configured to down-sample the non-linearity terms generated by the non-linearity term generator.

5. A zero-IF receiver comprising,
an amplifier configured to amplify a RF signal received by the zero-IF receiver,
a mixer coupled to the amplifier and configured to mix in-phase and quadrature phase components of a local oscillator signal with the amplified RF signal and down-convert the mixed signal to a baseband signal,
an analog low pass filter coupled to the mixer and configured to low pass filter the down-converted baseband signal,
an analog digital converter coupled to the analog low pass filter and configured to convert a down-converted baseband signal into a digital signal,
a non-linearity correction module coupled to the analog digital converter and configured to generate a non-linearity term scaled to mitigate an inter-modulation or harmonic component of the digital down-converted baseband signal, and
a decimation filter chain coupled to the analog digital converter and configured to down-sample the digital down-converted baseband signal,
wherein the non-linearity correction module is configured to mitigate the inter-modulation or the harmonic component before a last stage of down-sampling performed by the decimation filter chain.

6. The zero-IF receiver of claim 5, wherein the non-linearity correction module comprises,
a non-linearity term generator coupled to the analog digital converter and configured to generate a non-linearity term corresponding to the inter-modulation or harmonic component;
a coefficient multiplier coupled to the non-linearity term generator and configured to multiply the non-linearity term with a corresponding non-linearity term coefficient; and
a sum logic coupled to the coefficient multiplier and configured to add the non-linearity term multiplied by the corresponding non-linearity term coefficient to the digital down-converted baseband signal;
wherein the non-linearity term multiplied by the corresponding non-linearity term coefficient mitigates the corresponding inter-modulation or harmonic component;
wherein the non-linearity term coefficient is determined by injecting a RF test signal with frequencies based on the non-linearity term, and determining amplitude and phase of the RF test signal down-converted by the zero-IF receiver at the non-linearity term frequency.

7. The zero-IF receiver of claim 6,
wherein the non-linearity term coefficient is negative of the amplitude, and phase of, the down-converted RF test signal.

8. The zero-IF receiver of claim 6,
wherein the non-linearity term comprises at least one of the following signals, $$x^2_{bb}(t), |x_{bb}(t)|^2, |x_{bb}(t)|^2 x_{bb}(t), \text{ and } (x^*_{bb}(t))^3,$$

wherein $x_{bb}(t)$ is a complex baseband signal received by the zero-IF receiver;
where in $x^*_{bb}(t)$ is the complex conjugate of $x_{bb}(t)$;
wherein the coefficient multiplier is configured to determine a coefficient corresponding to one of the non-linearity terms by injecting a RF test signal based on a complex baseband signal with two complex exponentials at frequency f1 and frequency f2 to a zero-IF receiver comprising the non-linearity correction module, and observing an amplitude and phase of the RF test signal down-converted at a frequency corresponding to the one of the non-linearity terms,
wherein the frequency corresponding to the one of the non-linearity terms is based on frequency f1 and frequency f2.

9. The zero-IF receiver of claim 6 further comprising,
an interpolator coupled to the non-linearity term generator and configured to up-sample the baseband signal before the baseband signal is fed into the non-linearity term generator; and
a decimator coupled to the non-linearity term generator and configured to down-sample the non-linearity term generated by the non-linearity term generator.

10. A zero-IF receiver comprising,
an amplifier configured to amplify a RF signal received by the zero-IF receiver,
a mixer coupled to the amplifier and configured to mix in-phase and quadrature phase components of a local oscillator signal with the amplified RF signal and down-convert the mixed signal to a baseband signal,
an analog low pass filter coupled to the mixer and configured to low pass filter the down-converted baseband signal,
an analog digital converter coupled to the analog low pass filter and configured to convert a down-converted baseband signal into a digital signal,
a droop corrector coupled to the analog digital converter and configured to digitally compensate the digital, down-converted baseband signal for a droop within a passband caused by the analog low pass filter, and
a non-linearity correction module coupled to the droop corrector and configured to generate a non-linearity term scaled to mitigate an inter-modulation or harmonic component of the digital down-converted baseband signal,
wherein a signal response of the droop corrector is inverse to a signal response of the analog low pass filter.

11. The zero-IF receiver of claim 10 further comprising,
a droop coefficient storage module configured to store coefficient of the droop corrector for a first sampling rate; and
a coefficient transformation module coupled to the droop coefficient storage module and configured to transform the stored coefficient to correspond to a second sampling rate,
wherein the second sampling rate comprising a current sampling rate of the droop corrector.

12. The zero-IF receiver of claim 11,
wherein the coefficient transformation module is configured to fast fourier transform the stored coefficient, either interpolate or extrapolate the fast fourier transformed coefficient based on the second sampling rate, and inverse fast fourier transform the interpolated or extrapolated coefficient, and wherein the coefficient for the second sampling rate is based on the inverse fast fourier transformed coefficient.

13. The zero-IF receiver of claim 12,
wherein the coefficient transformation module is configured to interpolate the fast fourier transformed coefficient where the second sampling rate is smaller than the first sampling rate, and extrapolate the fast fourier transformed coefficient where the second sampling rate is larger than the first sampling rate.

14. The zero-IF receiver of claim 12,
wherein the coefficient transformation module is further configured to window the inverse fast fourier transformed coefficient to generate a length of coefficient corresponding to droop corrector, and
wherein the coefficient for the second sampling rate is further based on the windowed coefficient.

15. The zero-IF receiver of claim 14,
wherein the coefficient transformation module is further configured to compute an error of the windowed coefficient based on a difference between a window coefficient frequency response and a frequency response at the second sampling rate, and compensate the windowed coefficient based on the computed error, and
wherein the coefficient for the second sampling rate is further based on the compensated, windowed coefficient.

16. The zero-IF receiver of claim 10 further comprising,
a decimation filter chain coupled to the analog digital converter and configured to down-sample the digital down-converted baseband signal,
wherein the non-linearity correction module is configured to mitigate the inter-modulation or harmonic component before a last stage of down-sampling performed by the decimation filter chain.

17. The zero-IF receiver of claim 10, wherein the non-linearity correction module comprises,
a non-linearity term generator coupled to the analog digital converter and configured to generate a non-linearity term corresponding to the inter-modulation or harmonic component;
a coefficient multiplier coupled to the non-linearity term generator and configured to multiply the non-linearity term with a corresponding non-linearity term coefficient; and
a sum logic coupled to the coefficient multiplier and configured to add the non-linearity term multiplied by the corresponding non-linearity term coefficient to the digital down-converted baseband signal;

wherein the non-linearity term multiplied by the corresponding non-linearity term coefficient mitigates the corresponding inter-modulation or harmonic component.

18. The zero-IF receiver of claim 17,
wherein the non-linearity term coefficient is determined by injecting a RF test signal with frequencies based on the non-linearity term, and determining amplitude and phase of the RF test signal down-converted by the zero-IF receiver at the non-linearity term frequency.

19. The zero-IF receiver of claim 18,
wherein the non-linearity term coefficient is negative of the amplitude, and phase, of the down-converted RF signal.

20. The zero-IF receiver of claim 17,
wherein the non-linearity term comprises at least one of the following signals, $$X^2_{bb}(t), |X_{bb}(t)|^2, |X_{bb}(t)|^2 X_{bb}(t), \text{ and } (X^*_{bb}(t))^3,$$

wherein $x_{bb}(t)$ is the baseband signal received by the zero-IF receiver;
where in $x^*_{bb}(t)$ is the complex conjugate of $x_{bb}(t)$.

21. The zero-IF receiver of claim 20,
wherein the coefficient multiplier is configured to determine a coefficient corresponding to one of the non-linearity terms by injecting a RF test signal based on a complex baseband signal with two complex exponentials at frequency f1 and frequency f2 to a zero-IF receiver comprising the non-linearity correction module, and observing an amplitude and phase of the RF test signal down-converted at a frequency corresponding to the one of the non-linearity terms,
wherein the frequency corresponding to the one of the non-linearity terms is based on frequency f1 and frequency f2.

22. The zero-IF receiver of claim 17 further comprising,
a digital low pass filter coupled to the non-linearity term generator and configured to attenuate signals outside the baseband signal's bandwidth.

23. The zero-IF receiver of claim 17 further comprising,
an interpolator coupled to the non-linearity term generator and configured to up-sample the baseband signal before the baseband signal is fed into the non-linearity term generator; and
a decimator coupled to the non-linearity term generator and configured to down-sample the non-linearity term generated by the non-linearity term generator.

* * * * *